(12) United States Patent
Liu et al.

(10) Patent No.: US 9,851,480 B2
(45) Date of Patent: Dec. 26, 2017

(54) PRISM MODULE AND DISPLAY DEVICE

(71) Applicant: Young Lighting Technology Inc., Hsin-Chu (TW)

(72) Inventors: Chin-Ku Liu, Hsin-Chu (TW);
Jhong-Hao Wu, Hsin-Chu (TW);
Fa-Chih Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 15/490,910

(22) Filed: Apr. 19, 2017

(65) Prior Publication Data

US 2017/0322351 A1 Nov. 9, 2017

(30) Foreign Application Priority Data

May 4, 2016 (TW) .............................. 105113781 A

(51) Int. Cl.
*G02B 5/04* (2006.01)
*G02F 1/1335* (2006.01)

(52) U.S. Cl.
CPC ............. *G02B 5/04* (2013.01); *G02F 1/1335* (2013.01)

(58) Field of Classification Search
CPC . G02B 5/04; G02F 1/133308; G02F 1/13332; G02F 1/1335; G02F 1/1336
USPC .......................................... 359/833–834, 837
See application file for complete search history.

(56) References Cited

U.S. PATENT DOCUMENTS 7,554,628 B2   6/2009   Mitani et al.
9,612,468 B1   4/2017   Liu et al.
2004/0071417 A1   4/2004   Veligdan
2005/0248961 A1   11/2005   Kazuhiro et al.
2010/0238090 A1   9/2010   Pomerantz et al.
2010/0259566 A1   10/2010   Watanabe
2011/0242686 A1   10/2011   Watanabe
2014/0293434 A1*  10/2014   Cheng .................. G02B 27/225
                                                              359/630

(Continued)

FOREIGN PATENT DOCUMENTS

CN   101593473   12/2009
CN   102193195   9/2011

(Continued)

OTHER PUBLICATIONS

"Search Report of Europe Counterpart Application", dated Sep. 29, 2017, p1-p9, in which the listed references were cited.

*Primary Examiner* — James Phan
(74) *Attorney, Agent, or Firm* — JCIPRNET

(57) ABSTRACT

A display device includes a display and a prism module. The display has a display area and a frame area surrounding the display area. The display area has a plurality of corners. The prism module includes a first prism and a second prism. The first prism is located on an edge area of the display area. The first prism includes a plurality of first corner portions. Each first corner portion is correspondingly arranged in a corner of the display area. Each first corner portion has a first free-form curved surface. The second prism is located on the frame area and is conformally disposed beside the first prism. The second prism includes a plurality of second corner portions. Each second corner portion has a second free-form curved surface. The second free-form curved surface faces the first free-form curved surface. A prism module is also provided.

20 Claims, 12 Drawing Sheets

(56) References Cited

U.S. PATENT DOCUMENTS

2015/0091833 A1    4/2015   Wu
2015/0116852 A1    4/2015   Kim et al.

FOREIGN PATENT DOCUMENTS

| | | |
|---|---|---|
| CN | 101206327 | 11/2011 |
| CN | 102854644 | 1/2013 |
| CN | 202794587 | 3/2013 |
| CN | 203882090 | 10/2014 |
| CN | 104950504 | 9/2015 |
| CN | 103700323 | 12/2015 |
| JP | S60242424 | 12/1985 |
| JP | 2008060061 | 3/2008 |
| KR | 101178634 | 8/2012 |
| TW | 201403177 | 1/2014 |
| TW | 201405171 | 2/2014 |
| TW | 201432331 | 8/2014 |
| TW | 201432639 | 8/2014 |
| TW | 201512740 | 4/2015 |
| TW | 201513069 | 4/2015 |
| TW | 201513070 | 4/2015 |
| WO | 2013055852 | 4/2013 |

\* cited by examiner

PRISM MODULE AND DISPLAY DEVICE

CROSS-REFERENCE TO RELATED APPLICATION

This application claims the priority benefit of Taiwan application serial no. 105113781, filed on May 4, 2016. The entirety of the above-mentioned patent application is hereby incorporated by reference herein and made a part of this specification.

BACKGROUND OF THE INVENTION

Field of the Invention

The invention relates to a prism module and a display device.

Description of Related Art

A large-screen display system may collectively display signals from different signal sources, so as to satisfy users' requirements for displaying shared and comprehensive information on the large screen. At present, in various technical fields, the large display frame may be implemented by piecing several display screens together. It is common to piece several liquid crystal displays (LCDs) as the display unit. When several LCDs are pieced together as a large display screen, invalid display areas may exist among the display images of the LCDs; hence, the display images are not continuous as a whole, and the viewing quality is compromised.

Particularly, the invalid display areas may be categorized into invalid edge display areas and invalid corner display areas according to the locations of the corresponding display areas of the LCDs. The invalid edge display areas are adjacent to the sides of the valid display areas, and the invalid corner display areas are adjacent to the corners of the valid display areas. To display images on the invalid edge display areas, if the light path of the light beam moving to the invalid corner display areas is identical to the light path of the light beam moving to the invalid edge display areas, the invalid corner display areas may not display images because the light path of the light beam moving to the invalid corner display areas is required to be longer than that of the light moving to the invalid edge display areas. Accordingly, how to design a display that may display images on both the invalid edge display areas and the invalid corner display areas is one of the issues to be resolved in the pertinent field.

The information disclosed in this "BACKGROUND OF THE INVENTION" section is only for enhancement of understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be resolved by one or more embodiments of the invention were acknowledged by a person of ordinary skill in the art.

SUMMARY OF THE INVENTION

The invention provides a prism module. When the prism module is applied to a display device, the display device is able to accomplish borderless display effects.

The invention is directed to a display device that includes the prism module and thus may achieve the borderless display effects.

Other objects and advantages of the invention can be further illustrated by the technical features broadly embodied and described as follows.

In order to achieve at least one or a portion of or all of the objects or other objects, an embodiment of the invention provides a prism module suitable for being arranged on an edge area of a display area and a frame area of a display. The display area has a plurality of corners. The prism module includes a first prism and a second prism. The first prism is located on an edge area of a display area. The first prism includes a plurality of first corner portions. Each of first corner portions is correspondingly arranged in a one of the corners of the display area. Each of first corner portions has a first free-form curved surface. The second prism is located on the frame area and is conformally disposed beside the first prism. The second prism includes a plurality of second corner portions. Each of second corner portions has a second free-form curved surface. The second free-form curved surface faces the first free-form curved surface.

In order to achieve at least one or a portion of or all of the objects or other objects, one embodiment of the invention provides a display device including a display and said prism module. The display has a display area and a frame area surrounding the display area. The display area has a plurality of corners.

In view of the above, the display device and the prism module of embodiments of the invention may achieve at least one of advantages or effects as listed below. The display device of embodiments of the invention is able to accomplish borderless display effects: the prism module of embodiments includes the first prism and the second prism, the first prism is located on the edge area of the display area, and the first corner portions correspond to the corners of the display area; the second prism is located on the frame area of the display and is conformally disposed beside the first prism, and the first free-form curved surfaces of the first corner portions of the first prism face the second free-form curved surfaces of the second corner portions of the second prism. Since the display device of embodiments includes said prism module and has the arrangement described above, the display device may display images not only in the display area but also in the corner frame area and the edge frame area of the frame area, so as to achieve the borderless display effects.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
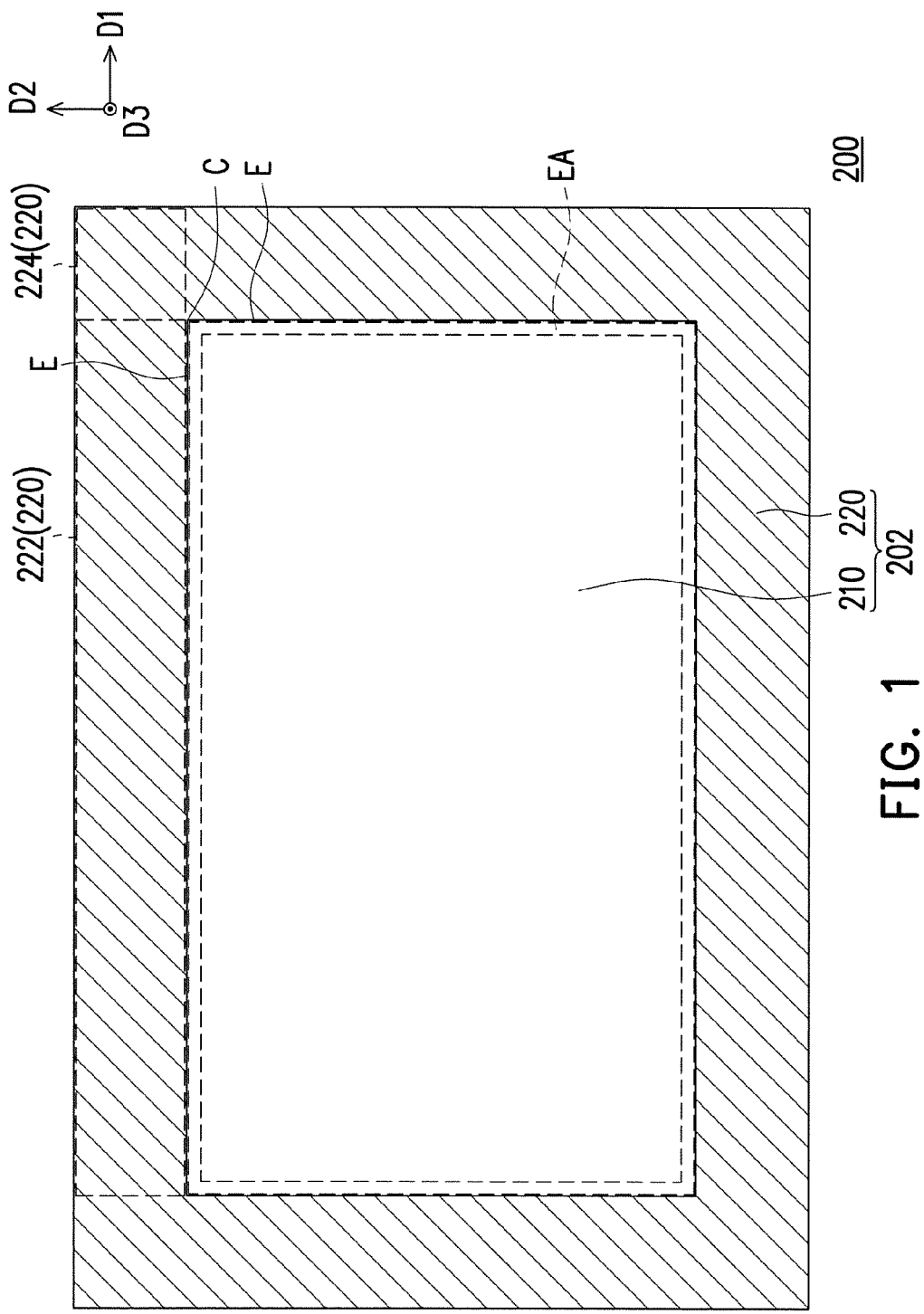
FIG. 1 is a schematic top view illustrating a display of a display device according to an embodiment of the invention.

FIG. 1 is a schematic top view illustrating a display of a display device according to an embodiment of the invention.

To elaborate the arrangement in the display device 200, the display device 200 provided in the embodiment may be deemed as being located in a space constructed by a first direction D1, a second direction D2, and a third direction D3. The first direction D1 is, for instance, substantially perpendicular to the second direction D2. The third direction D3 is, for instance, substantially perpendicular to both the first direction D1 and the second direction D2. In the embodiment, the direction D1 is a vertical direction, for instance. The second direction D2 is a horizontal direction, for instance. The third direction D3 is a normal direction, for instance. In addition, a fourth direction D4 is, for instance, between the first direction D1 and the second direction D2 and substantially parallel to a line segment A-A'. The fifth direction D5 is, for instance, substantially perpendicular to both the third direction D3 and the fourth direction D4.

With reference to FIG. 1, in the embodiment, the display device 200 includes a display 202. The display 202 has a display area 210 and a frame area 220 surrounding the display area 210. The display 202 has a plurality of display pixels (not shown) to display images, and the frame area 220 serves as a non-display area of the display 202. The display area 210 of the display 202 has a plurality of corners C. Specifically, the display area 210 has a plurality of sides E. Each of the corners C of the display area 210 is located at the junction of two adjacent sides E. The display area 210 has an edge area EA (i.e., an area between two long dotted lines shown in FIG. 2A). The edge area EA of the display area 210 is close to the frame area 220.

With reference to FIG. 1, in the embodiment, the frame area 220 may be further divided into an edge frame area 222 and a corner frame area 224 according to the locations of areas in the display area 210 corresponding to the locations of the edge frame area 222 and the corner frame area 224 of the frame area 220. The edge frame area 222 is beside the sides E of the display area 210, and the corner frame area 224 is beside the corners C of the display area 210.

In the embodiment, the display 202 is, for instance, a liquid crystal display (LCD). In other embodiments, the display 202 may be of other types, e.g., an organic light emitting display (OLED), a light emitting diode (LED) display, and so on, which should not be construed as limitations to the invention. Besides, in the embodiment, teachings and suggestions of the way to operate and implement the display 202 should be known to people in the pertinent field and hence will not be further provided.

Figure 2A:
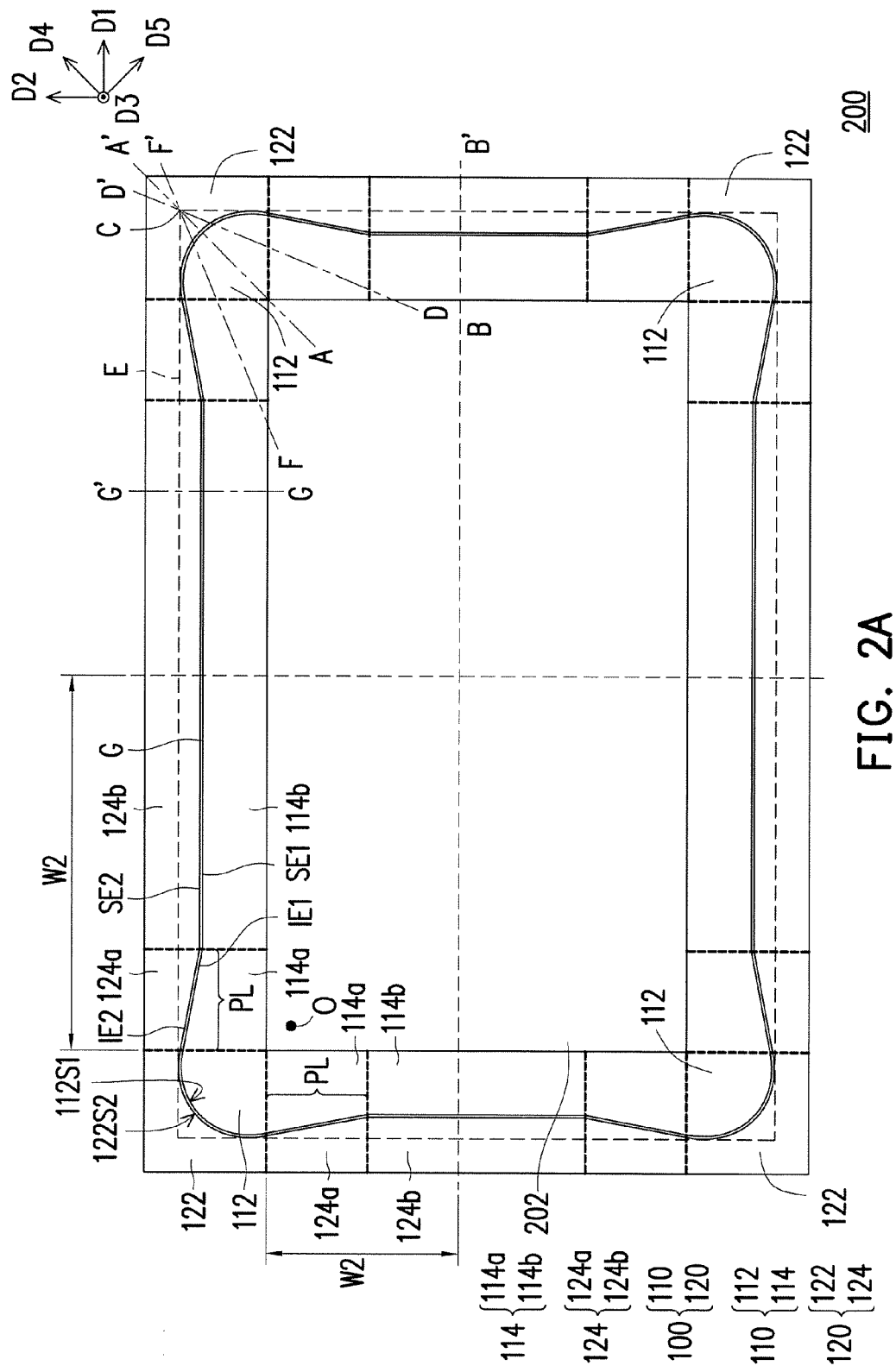
FIG. 2A is a schematic top view illustrating a display device according to an embodiment of the invention.
Figure 2B:
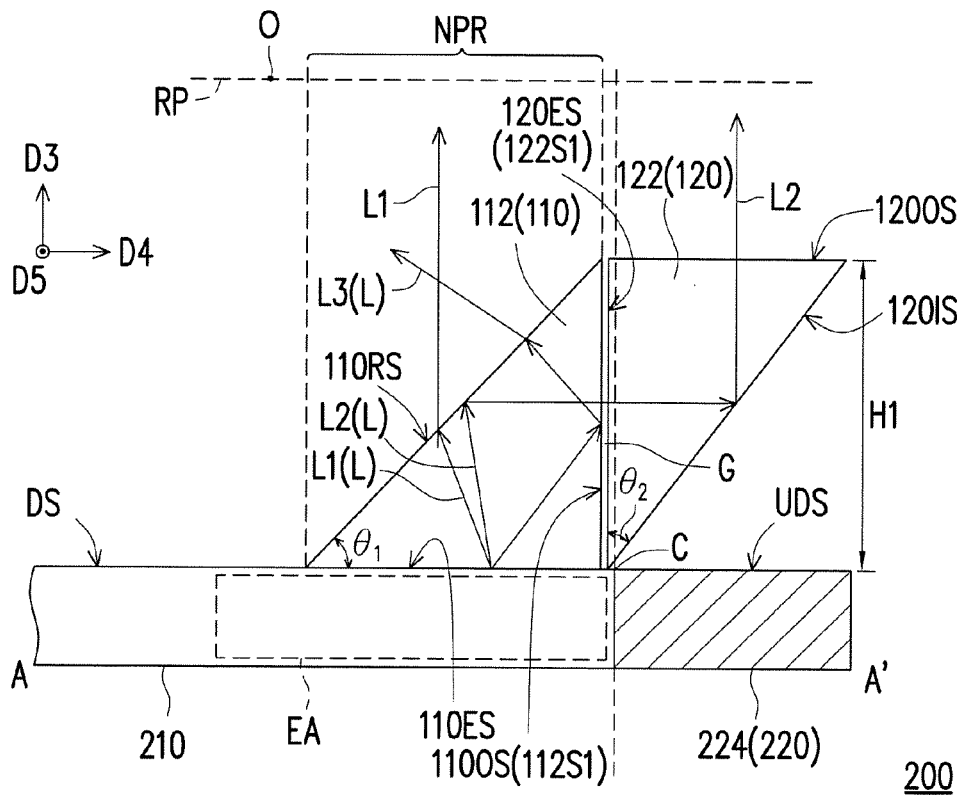
FIG. 2B is a partial cross-sectional side view illustrating a junction (along a line segment A-A') of a display area and a frame area in the display device depicted in FIG. 2A.
Figure 2C:
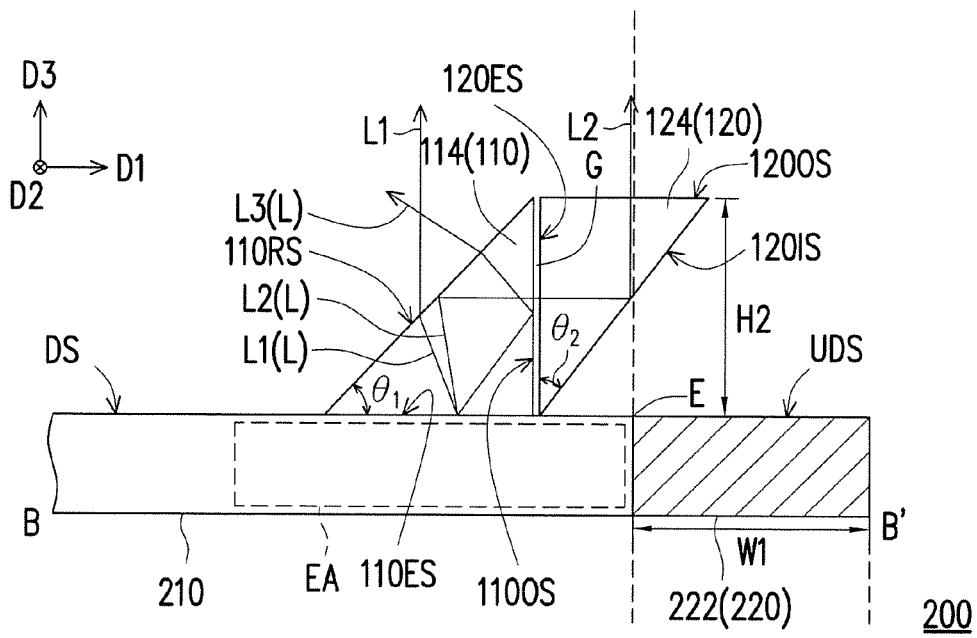
FIG. 2C is a partial cross-sectional side view illustrating a junction (along a line segment B-B') of a display area and a frame area in the display device depicted in FIG. 2A.
Figure 2D:
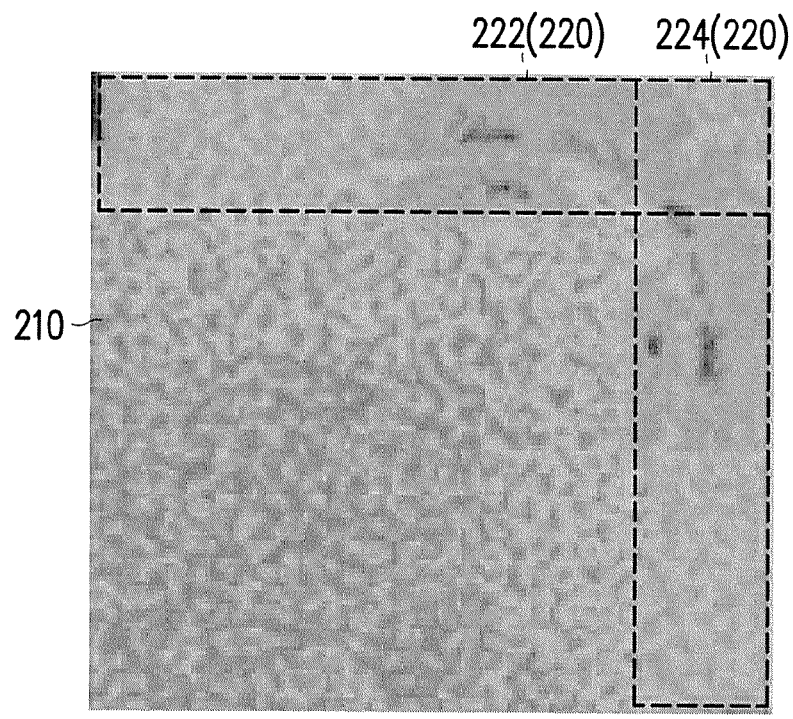
FIG. 2D illustrates optical simulation results in the edge area and the corners in the display device depicted in FIG. 2A.

FIG. 2A is a schematic top view illustrating a display device according to an embodiment of the invention. FIG. 2B is a partial cross-sectional side view illustrating a junction (along a line segment A-A') of a display area and a frame area in the display device depicted in FIG. 2A. FIG. 2C is a partial cross-sectional side view illustrating a junction (along a line segment B-B') of a display area and a frame area in the display device depicted in FIG. 2A. FIG. 2D illustrates optical simulation results in the edge area and the corners in the display device depicted in FIG. 2A.

With reference to FIG. 2A, in the embodiment, the display device 200 further includes a prism module 100. The prism module 100 includes a first prism 110 and a second prism 120. In the embodiment, the first prism 110 and the second prism 120 are made of a transparent material, for instance. The transparent material is, for instance, polymethylmethacrylate (PMMA), polycarbonate (PC), and glass, which should however not be construed as a limitation to the invention. The arrangement of each element in the first prism 110 and the second prism 120 will be elaborated below.

With reference to FIG. 2A, FIG. 2B, and FIG. 2C, the first prism 110 as shown in FIG. 2B and FIG. 2C is located on the edge area EA of the display area 210. As shown in FIG. 2A, the first prism 110 includes a plurality of first corner portions 112 and a plurality of first side portions 114, e.g., four first corner portions 112 and four first side portions 114, and the invention should not be limited thereto. Each of first corner portions 112 is correspondingly arranged in one of the corners C of the display area 210, as shown in FIG. 2A and FIG. 2B. Each of first corner portions 112 of the first prism 110 has a first free-form curved surface 112S1. The first side portions 114 are respectively located adjacent to the sides E of the display area 210, as shown in FIG. 2A and FIG. 2C. In the embodiment, each first corner portion 112 and two adjacent first side portions 114 are integrally formed, and thus the first prism 110 along the third direction D3 appears to have a rectangular-opening shape.

With reference to FIG. 2A, the second prism 120 is located on the frame area 220 and conformally disposed beside the first prism 110. The second prism 120 includes a plurality of second corner portions 122 and a plurality of second side portions 124, e.g., four second corner portions 122 and four second side portions 124, and the invention should not be limited thereto. The second side portions 124 are respectively located adjacent to the sides E of the display area 210, as shown in FIG. 2A and FIG. 2C. As shown in FIG. 2A, FIG. 2B, and FIG. 2C, the second corner portions 122 of the second prism 120 are conformally disposed beside the first corner portions 112 of the first prism 110, and the second side portions 124 of the second prism 120 are conformally disposed beside the first side portions 114 of the first prism 110. In the embodiment, each second corner portion 122 and two adjacent second side portions 124 are integrally formed, and thus the second prism 120 along the third direction D3 appears to have a rectangular-opening shape.

Each of second corner portions 122 of the second prism 120 has a second free-form curved surface 122S2. The first free-form curved surfaces 112S1 of the first corner portions 112 face the second free-form curved surfaces 122S2 of the second corner portions 122. In particular, the first free-form curved surfaces 112S1 and the second free-form curved surfaces 122S2 are conformal. In the embodiment, the first free-form curved surfaces 112S1 and the second free-form curved surfaces 122S2 are continuous free-form curved surfaces, for instance.

With reference to FIG. 2D, images are shown in the edge areas and the corners of the display device 200 according to the embodiment. Through the arrangement provided below, the display device 200 described in the embodiment may achieve the image display effects as shown in FIG. 2D: the first prism 110 is located on the edge area EA of the display area 210, and the first corner portions 112 of the first prism 110 correspond to the corners C of the display area 210. The second prism 120 is located on the frame area 220 of the display 202 and is conformally disposed beside the first prism 110. The first free-form curved surfaces 112S1 of the first corner portions 112 of the first prism 110 face the second free-form curved surfaces 122S2 of the second corner portions 122 of the second prism 120. Said arrangement allows the display device 200 provided in the embodiment to display images not only in the display area 210 but also in the corner frame area 224 and the edge frame area 222 of the frame area 220, as shown in FIG. 2D. That is, the display device 200 provided in the embodiment is able to accomplish the borderless display effects both in the corner frame area 224 of the frame area 220 and in the edge frame area 222 of the frame area 220.

In FIG. 2A, an orthogonal projection pattern of each first free-form curved surface 112S1 on a reference plane is a partial circular pattern, and the reference plane is substantially parallel to a surface of the display 202 (i.e., the display surface DS shown in FIG. 2B and FIG. 2C). As depicted in FIG. 2A, the partial circular pattern has a center O. With reference to FIG. 2A and FIG. 2B, the first corner portion 112 of the first prism 110 is orthogonally projected onto the reference plane RP (parallel to the display surface DS) to form an orthogonal projection area NPR. A location of the center O on the reference plane RP is located outside the orthogonal projection area NPR. Specifically, the partial circular pattern has a radius. In some embodiments of the invention, the radius falls within a range from 1 mm to 1000 mm, for instance. If the radius is too small (for example, less than 1 mm), the light beam is transmitted at a large deflection angle in the prism (i.e., the first and second prisms 110 and 120) and is thus transmitted far. As a result, the overall brightness distribution is away from the corners C of the display area 210. By contrast, if the radius is too large (for example, greater than 1000 mm), the light beam is transmitted at a small deflection angle in the prism (i.e., the first and second prisms 110 and 120) and thus may not transmitted with ease. As a result, the overall brightness distribution is around the corners C of the display area 210. Through adjusting the radius to the range from 1 mm to 1000 mm, parts of the light beam may be transmitted far while the others are not. The overall brightness may be evenly distributed in the corners C of the display area 210.

With reference to FIG. 2A, in the embodiment, each of the first side portions 114 further includes a first side buffer portion 114a and a first side main body portion 114b. The first side buffer portion 114a is located between the first side main body portion 114b and one of the first corner portions 112. The first side buffer portion 114a acts as a buffer segment between the first corner portion 112 in one shape and the first side main body portion 114b in another shape. The first side main body portion 114b has a first side edge SE1, and the first side buffer portion 114a has a first inclined side edge IE1 inclining relative to the first side edge SE1. Each of the second side portions 124 further includes a second side buffer portion 124a and a second side main body portion 124b. The second side buffer portion 124a acts as a buffer segment between the second corner portion 122 in one shape and the second side main body portion 124b in another shape. The second side main body portion 124b has a second side edge SE2. The second side buffer portion 124a has a second inclined side edge IE2 inclining relative to the second side edge SE2.

In the embodiment, in a direction (i.e., the first direction D1 or the second direction D2) parallel to one of the sides E of the display area 210 and away from the first corner portions 112, the projection length PL of the first inclined side edge IE1 on the one of the sides E of the display area 210 is within a range from 0.5×W1 to W2. Here, W1 is a width of the frame area 220 in the first direction D1 or the second direction D2, as shown in FIG. 2C, and W2 is a width half the distance from the first side buffer portion 114a adjacent to the one of the first corner portions 112 (along the first direction D1 or the second direction D2) to the one of the sides E of the display area 210, as shown in FIG. 2A. If the projection length PL is less than 0.5×W1, the curvature of the first free-form curved surface 112S1 varies to an excessive extent, and therefore parts of the light beam are restricted within the first prim 110 or the second prism 120 and may not be emitted. If the projection length PL is greater than W2, the shape of the first side main body portion 114b is subject to the excessive projection length PL, and thus the frame area 220 may not be covered. In other words, as long as the projection length PL is within the range from 0.5×W1 to W2, favorable light exiting efficiency of the display device 200 provided in the embodiment can be guaranteed.

The optical principles of the display device 200 will be elaborated hereinafter. Before that, the arrangement of the first prism 110, the second prism 120, and the display device 202 will be elaborated.

With reference to FIG. 2B and FIG. 2C, the first prism 110 has a first light incident surface 110ES, a reflective-refractive surface 110RS, and a first light exiting surface 110OS. The first light incident surface 110ES faces the display area 210. A first inclined angle $\theta_1$ is between the reflective-refractive surface 110RS and the first light incident surface 110ES. The first light exiting surface 110OS connects the first light incident surface 110ES and the reflective-refractive surface 110RS. The second prism 120 has a second light incident surface 120ES, an inclined surface 120IS, and a second light exiting surface 120OS. The second light incident surface 120ES of the second prism 120 faces the first light exiting surface 110OS of the first prism 110. The inclined surface 120IS connects the second light incident surface 120ES and the second light exiting surface 120OS. The second light exiting surface 120OS is located above the frame area 220 (i.e., the corner frame area 224 in FIG. 2B) and faces away the frame area 220. A second inclined angle $\theta_2$ is between the inclined surface 120IS and the second light incident surface 120ES.

According to another embodiment of the invention, the first inclined angle $\theta_1$ is greater than 10 degrees and less than 80 degrees. The second inclined angle $\theta_2$ is greater than 10 degrees and less than 80 degrees. In some embodiments of the invention, the first inclined angle $\theta_1$ is substantially 40 degrees, and the second inclined angle $\theta_2$ is substantially 45 degrees, for instance. In other embodiments of the invention, the first inclined angle $\theta_1$ is substantially 45 degrees, for instance, and the second inclined angle $\theta_2$ is substantially 45 degrees, for instance. Through the design of the first inclined angle $\theta_1$ and the second inclined angle $\theta_2$, the issue of dispersed light beam is less likely to occur in the display device provided in other embodiments of the invention.

With reference to FIG. 2B and FIG. 2C, in the embodiment, the first light exiting surface 110OS of the first prism 110 is adjacent to and faces the second light incident surface 120ES of the second prism 120. The first free-form curved surface 112S1 shown in FIG. 2A is the first light exiting surface 110OS of the first prism 110 located at the first corner portion 112, and the second free-form curved surface 122S2 shown in FIG. 2A is the second light incident surface 120ES of the second prism 120 located at the second corner portion 122. A gap G is between the first light exiting surface 110OS and the second light incident surface 120ES. Specifically, the first prism 110 provided in the embodiment is located above the display area 210. One portion of the second prism 120 is located above the display area 210, and the other portion of the second prism 120 is located above the frame area 220. The gap G between the first prism 110 and the second prism 120 is located above the display area 210 (i.e., within the range covered by the display area 210). In some embodiments of the invention, the gap G may be substantially aligned to the junction between the display area 210 and the frame area 220. In the embodiment, the first incident surface 110ES of the first prism 110 may directly face down and is placed onto the edge area EA of the display area 210. Alternatively, the first incident surface 110ES of the first prism 110 may directly face down and is adhered to the edge area EA of the display area 210 by an adhesive. The second prism 120 may be fixed by a mechanical member or any other supporting member and is arranged adjacent to the first prism 110, and the second light incident surface 120ES of the second prism 120 faces the first light exiting surface 110OS of the first prism 110. The gap G between the first prism 110 and the second prism 120 is an air gap, a gas gap, or a vacuum gap, for instance, which should however not be construed as a limitation to the invention.

Figure 2E:
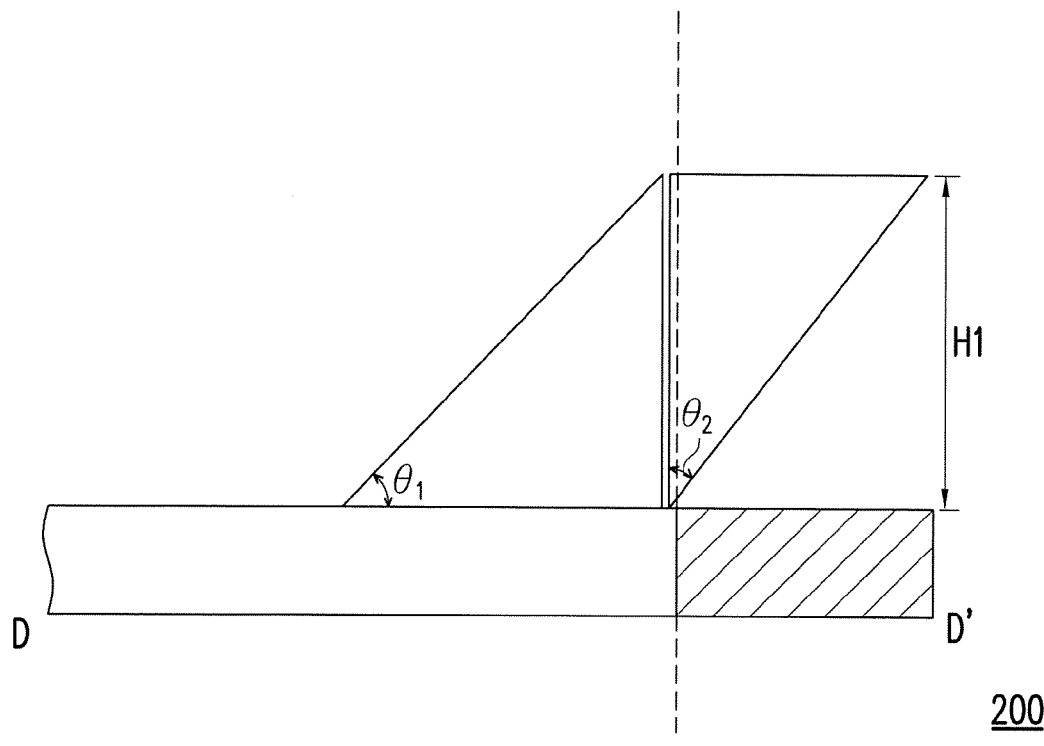
FIG. 2E is a partial cross-sectional side view illustrating a junction (along a line segment D-D') of a display area and a frame area in the display device depicted in FIG. 2A.
Figure 2F:
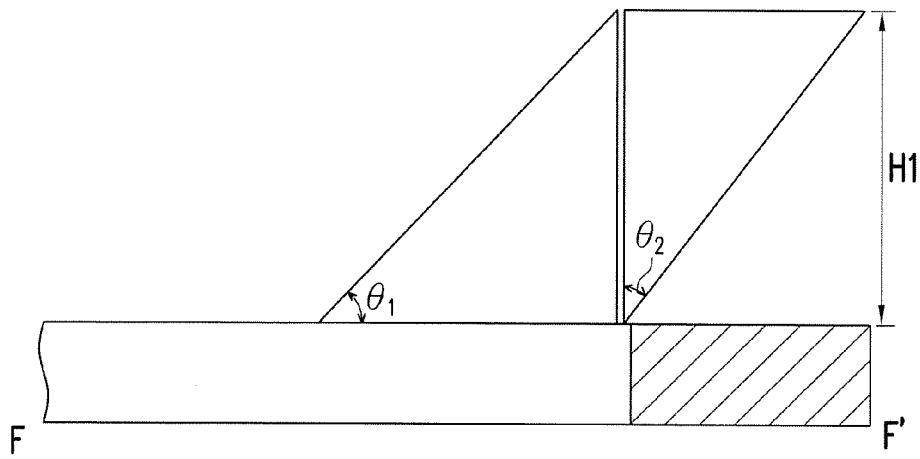
FIG. 2F is a partial cross-sectional side view illustrating a junction (along a line segment F-F') of a display area and a frame area in the display device depicted in FIG. 2A.
Figure 2G:
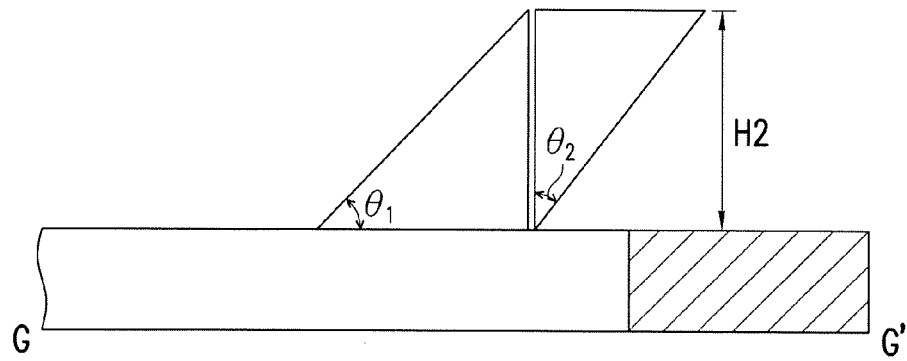
FIG. 2G is a partial cross-sectional side view illustrating a junction (along a line segment G-G') of a display area and a frame area in the display device depicted in FIG. 2A.

FIG. 2E is a partial cross-sectional side view illustrating a junction (along a line segment D-D') of a display area and a frame area in the display device depicted in FIG. 2A. FIG. 2F is a partial cross-sectional side view illustrating a junction (along a line segment F-F') of a display area and a frame area in the display device depicted in FIG. 2A. FIG. 2G is a partial cross-sectional side view illustrating a junction (along a line segment G-G') of a display area and a frame area in the display device depicted in FIG. 2A. To clearly illustrate the angle relationship, FIG. 2E, FIG. 2F, and FIG. 2G merely show the reference numbers of the display device 200, the line segments D-D', F-F', and G-G', the first inclined angle $\theta_1$, and the second inclined angle $\theta_2$.

With reference to FIG. 2B, FIG. 2C, FIG. 2E, FIG. 2F, and FIG. 2G, each of the partial cross-sections shown in FIG. 2B, FIG. 2E, and FIG. 2F passes through one of the first corner portions 112 and one of the corners C of the display area 210. Here, the partial cross-sections shown in FIG. 2B, FIG. 2E, and FIG. 2F are first cross-sections. The first inclined angle $\theta_1$ on the first cross-section is a first corner inclined angle, and the second inclined angle $\theta_2$ on the first cross-section is a second corner inclined angle. The first corner inclined angles on the first cross-sections are substantially equal, and the second corner inclined angles on the first cross-sections are substantially equal. That is, the first inclined angle $\theta_1$ (i.e., the first corner inclined angle) shown in FIG. 2B, FIG. 2E, and FIG. 2F is substantially identical, and so is the second inclined angle $\theta_2$ (i.e., the second corner inclined angle) shown in FIG. 2B, FIG. 2E, and FIG. 2F. In FIG. 2C and FIG. 2G, each of partial cross-section is perpendicular to one of the sides E of the display area 210 and passes through one of the first side portions 114 and one of the second side portions 124. Here, the partial cross-sections in FIG. 2C and FIG. 2G are second cross-sections. The first inclined angle $\theta_1$ on the second cross-section in FIG. 2C and FIG. 2G is a first side inclined angle, for instance, and the second inclined angle $\theta_2$ on the second cross-section in FIG. 2C and FIG. 2G is a second side inclined angle, for instance. The first side inclined angles on the second cross-sections are substantially equal, and the second side inclined angles on the second cross-sections are substantially equal. That is, the first inclined angle $\theta_1$ (i.e., the first side inclined angle) shown in FIG. 2C and FIG. 2G is substantially identical, and so is the second inclined angle $\theta_2$ (i.e., the second side inclined angle) shown in FIG. 2C and FIG. 2G. To be specific, the first corner inclined angles are substantially equal to the first side inclined angles, and the second corner inclined angles are substantially equal to the second side inclined angles. Namely, the first inclined angle $\theta_1$ in FIG. 2B, FIG. 2C, FIG. 2E, FIG. 2F, and FIG. 2G is substantially identical; the second inclined angle $\theta_2$ in FIG. 2B, FIG. 2C, FIG. 2E, FIG. 2F, and FIG. 2G is substantially identical. In brief, on different cross-sections, the first prism 110 provided in the embodiment has the identical first inclined angles $\theta_1$, and the second prism 120 has the identical second inclined angles $\theta_2$.

With reference to FIG. 2B and FIG. 2C, in the embodiment, the display area 210 has a display surface DS, and the frame area 220 has a non-display surface UDS. The display surface DS of the display area 210 and the non-display surface UDS of the frame area 220 are substantially aligned to each other. In the embodiment, a height H1 (see FIG. 2B) of each of the first corner portions 112 of the first prism 110 relative to the display surface DS of the display area 210 is greater than or equal to $\sqrt{2}$ times a height H2 (see FIG. 2C) of each of the first side portions 114 of the first prism 110 relative to the display surface DS of the display area 210. A height H1 of each of the second corner portions 122 of the second prism 120 relative to the non-display surface UDS (see FIG. 2B) of the frame area 220 is greater than or equal to $\sqrt{2}$ times a height H2 (see FIG. 2C) of each of the second side portions 124 of the second prism 120 relative to the non-display surface UDS of the frame area 220. Through the different heights of the corner and side portions, on the first and second cross-sections, the first prism 110 provided in the embodiment has the identical first inclined angles $\theta_1$, and the second prism 120 has the identical second inclined angles $\theta_2$. In the prism module 100 provided in the embodiment, first free-form curved surfaces 112S1 are formed in the first corner portions 112, second free-form curved surfaces 122S2 are formed in the second corner portions 122, the first free-form curved surfaces 112S1 are continuous curved surfaces, and the second free-form curved surfaces 122S2 are continuous curved surfaces for instance.

The optical principles of the display device 200 will be elaborated hereinafter.

Please refer to FIG. 2B and FIG. 2C. In particular, FIG. 2B illustrates a partial cross-section passing through the first corner portions 112 and the second corner portions 122, and FIG. 2C illustrates a partial cross-section passing through the first side portions 114 and the second side portions 124. A light path shown in FIG. 2B corresponds to a light path of the corner frame area 224, and a light path shown in FIG. 2C corresponds to a light path of the edge frame area 222. With reference to FIG. 2B and FIG. 2C, light beam L is emitted from an area of the display area 210 covered by the first light incident surface 110ES. In particular, the light beam L passes through the pixels of the display area 210 and is emitted from the surface of the display area 210 facing the first prism 110. According to the embodiment, the light beam L includes light beam L1 and light beam L2. The light L1 (i.e., one portion of the light beam L) passes through the first light incident surface 110ES and is then refracted by the reflective-refractive surface 110RS to a top of the display area 210, such that viewers are able to observe the display images on the edge area EA of the display area 210. Another portion of light beam (e.g., the light beam L2) from the area of the display area 210 covered by the first light incident surface 110ES sequentially passes through the first light incident surface 110ES, is reflected by the reflective-refractive surface 110RS, passes through the first light exiting surface 110OS, the gap G, the second light incident surface 120ES, and the second light exiting surface 120OS to a top of the frame area 220. Specifically, the inclined surface 120IS of the second prism 120 reflects at least parts of the light beam L2 from the first light incident surface 110ES to the second light exiting surface 120OS. After the light beam L2 passes through the first light incident surface 110ES and enters the first prism 110, the incident angle of the light beam L2 on the reflective-refractive surface 110RS is greater than a critical angle, thus resulting in total internal reflection (TIR). Due to the TIR of the light beam L2 on the reflective-refractive surface 110RS, the light beam L2 is directed to the first light exiting surface 110OS. After that, the light beam L2 sequentially passes through the first light exiting surface 110OS, the gap G and the second light incident surface 120ES of the second prism 120, and the TIR of the light beam L2 also occurs on the inclined surface 120IS. Due to the TIR of the light beam L2 on the inclined surface 120IS, the light beam L2 is directed to the second light exiting surface 120OS. In the embodiment, the light beam L further includes light beam L3 that is transmitted to the first light exiting surface 110OS. The light beam L3 on the first light exiting surface 110OS is reflected to the reflective-refractive surface 110RS and is emitted from the reflective-refractive surface 110RS. Particularly, the refractive index of the first prism 110 is greater than the refractive index of the gap G; hence, the TIR of the light beam L3 on the first light exiting surface 110OS easily occurs, and the light beam L3 is then directed to the reflective-refractive surface 110RS and is then emitted from the reflective-refractive surface 110RS.

In light of the above, through the different heights of the corner and side portions in the prism module 100, on the first cross-sections and second cross-sections, the first prism 110 provided in the embodiment has the identical first inclined angles $\theta_1$, and the second prism 120 has the identical second inclined angles $\theta_2$. The first free-form curved surfaces 112S1 (e.g., the first light exiting surfaces 110OS) are formed in the first corner portions 112, and the second free-form curved surfaces 122S2 (e.g., the second light incident surfaces 120ES) are formed in the second corner portions 122. Thereby, the light path of the light beam L in the corner frame area 224 is extended, the light emission in the corner frame area 224 and the light emission in the edge frame area 222 are consistent, and the conventional issue that the invalid corner display area may not display any image may be resolved. In FIG. 2B, the frame area 220 acting as the non-display area (i.e., the corner frame area 224 in FIG. 2B) may also display images through the light beam L2 emitted from the second light exiting surface 120OS and transmitted to the top of the frame area 220. Similarly, in FIG. 2C, the frame area 220 acting as the non-display area (i.e., the edge frame area 222 in FIG. 2C) may also display images through the light beam L2 emitted from the second light exiting surface 120OS and transmitted to the top of the frame area 220. Hence, the display device 200 provided in the embodiment is able to accomplish the borderless display effects both in the corner frame area 222 of the frame area 220 and in the edge frame area 222 of the frame area 224, and the display effects in these areas are consistent.

Figure 3:
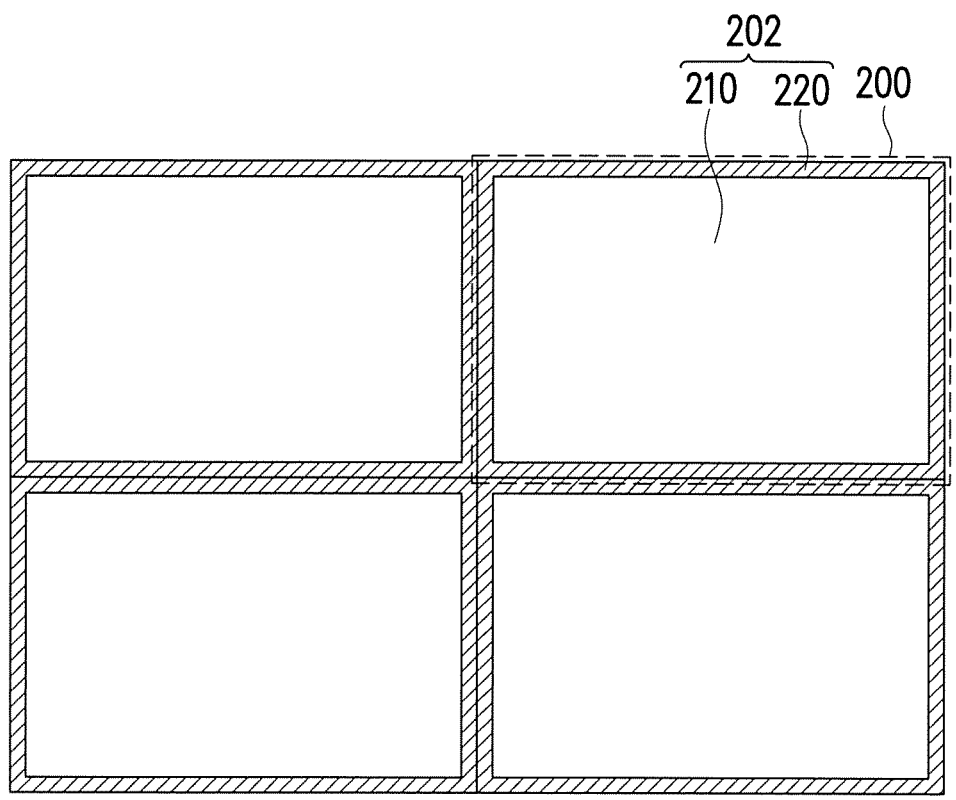
FIG. 3 is a schematic top view illustrating plural display devices depicted in FIG. 2A and pieced together according to an embodiment of the invention.

FIG. 3 is a schematic top view illustrating plural display devices depicted in FIG. 2A and pieced together according to an embodiment of the invention.

With reference to FIG. 2A, FIG. 2B, FIG. 2C, and FIG. 3, in the embodiment, four display devices 200 are pieced together in a 2×2 manner, so as to achieve large-scale display effects through expanding the display area. However, in some embodiments of the invention, the display devices of other types may also be pieced together in another different manner, which should not be construed as a limitation to the invention. In the embodiment, the second prism 120 in each display device 200 is located above the frame area 220 of the display 202 and is disposed beside the first prism 110. One portion of light beam (e.g., the light beam L2) from the display area 210 of the display 202 covered by the first light incident surface 110ES sequentially passes through the first light incident surface 110ES, is reflected by the reflective-refractive surface 110RS, passes through the first light exiting surface 110OS, the gap G the second light incident surface 120ES, and the second light exiting surface 120OS to a top of the frame area 220. Therefore, the frame area 220 acting as the non-display area may also display images through the light beam L2 emitted from the second light exiting surface 120OS and transmitted to the top of the frame area 220, such that the display devices 200 may achieve the borderless display effects. In the embodiment, when viewers view images on the display devices 200 shown in FIG. 3, the viewers do not observe the borders of the display devices 200. Besides, another portion of the light beam L (i.e., the light beam L3) from the display area 210 of the display 202 covered by the first light incident surface 110ES is reflected by the first light exiting surface 110OS, directed to the reflective-refractive surface 110RS, and emitted from the reflective-refractive surface 110RS. Hence, when the viewers view images on the display devices 200 from one side of the first prisms 110 at a large viewing angle, e.g., in a direction toward the frame areas 220 from the reflective-refractive surfaces 110RS of the first prisms 110, the viewers see the images displayed by means of the light L3 without observing the borders of the display devices 200; thus, the viewing angle of the display images on the frame area 220 of each display device 200 can be expanded.

It should be mentioned that reference numbers and some descriptions provided in the previous exemplary embodiment are also applied in the following exemplary embodiment. The same reference numbers represent the same or similar components in these exemplary embodiments, and repetitive descriptions are omitted.

Figure 4:
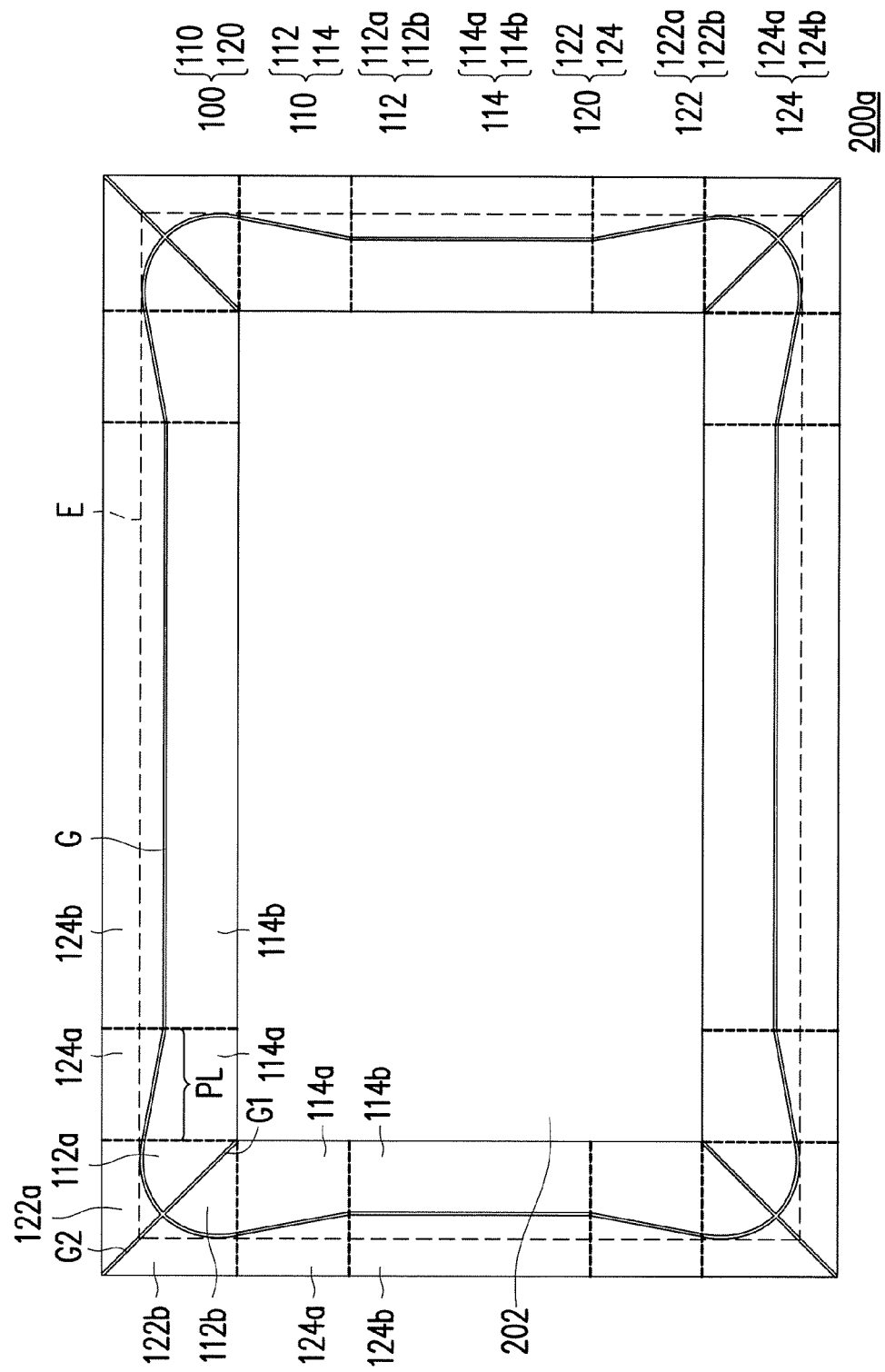
FIG. 4 is a schematic top view illustrating a display device according to another embodiment of the invention.

FIG. 4 is a schematic top view illustrating a display device according to another embodiment of the invention.

With reference to FIG. 4, in the embodiment, components in the display device 200a are similar to those in the display device 200, and one of the differences between the display devices 200a and 200 lies in that each of the first corner portions 112 of the display device 200a further includes a first corner sub-portion 112a and a second corner sub-portion 112b. The first corner sub-portion 112a is located between the second corner sub-portion 112b and one of the first side portions 114 closest to the first corner sub-portion 112a. The second corner sub-portion 112b is located between the first corner sub-portion 112a and one of the first side portions 114 closest to the second corner sub-portion 112b. Each of the second corner portions 122 further includes a third corner sub-portion 122a and a fourth corner sub-portion 122b. The third corner sub-portion 122a is located between the fourth corner sub-portion 122b and one of the second side portions 124 closest to the third corner sub-portion 122a. The fourth corner sub-portion 122b is located between the third corner sub-portion 122a and one of the second side portions 124 closest to the fourth corner sub-portion 122b. According to the embodiment of the invention, a first gap G1 is between the first corner sub-portion 112a and the second corner sub-portion 112b. A second gap G2 is between the third corner sub-portion 122a and the fourth corner sub-portion 122b. Each first corner portion 112a and the first side portion 114 which is closest to the first corner portion 112a are integrally formed. Each second corner portion 112b and the first side portion 114 which is closest to the second corner portion 112b are integrally formed. Each third corner portion 122a and the second side portion 124 which is closest to the third corner portion 122a are integrally formed. Each fourth corner portion 122b and the second side portion 124 which is closest to fourth corner portion 122b are integrally formed. In the embodiment, the first gap G1 and the second gap G2 communicate with the gap G, for instance.

The first gap G1 and the second gap G2 provided herein are air gaps, gas gaps, or vacuum gaps, for instance, which should however not be construed as a limitation to the invention.

In the embodiment, through the first gap G1 between the first corner sub-portion 112a and the second corner sub-portion 112b and the second gap G2 between the third corner sub-portion 122a and the fourth corner sub-portion 122b, the display device 200a may further totally reflect the ambient light and directly transmit the ambient light to the display 202. Thereby, in the display device 200a provided in the embodiment, the probability of reflecting the ambient light to the viewers by the reflective-refractive surface 110RS (not shown in FIG. 4, see FIG. 2B) of the first prism 110 may be reduced, and the issues of noise and normally white frames are less likely to occur. As a result, the display device 200a provided herein may display images with favorable quality.

Figure 5:
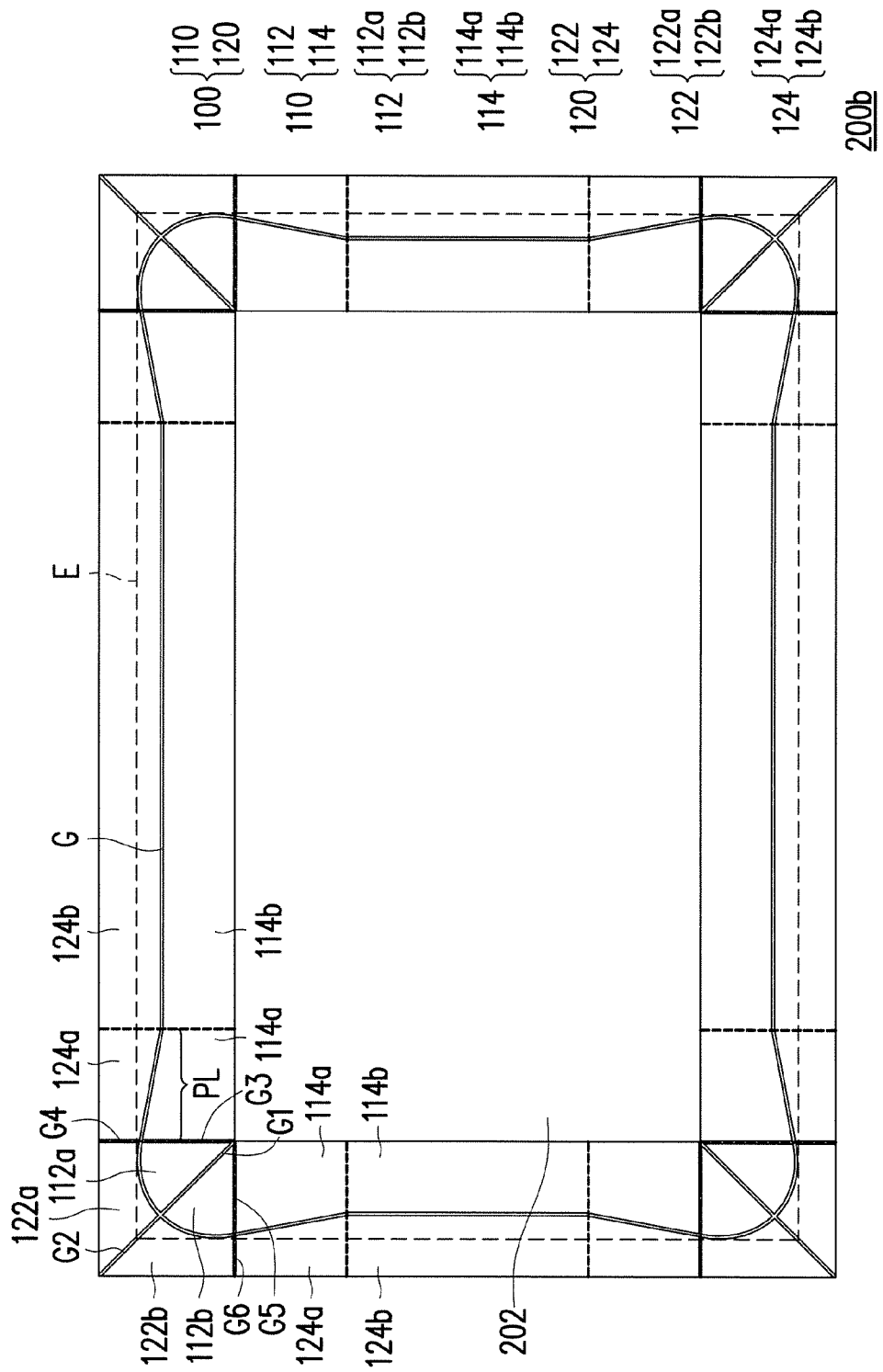
FIG. 5 is a schematic top view illustrating a display device according to another embodiment of the invention.

FIG. 5 is a schematic top view illustrating a display device according to another embodiment of the invention.

With reference to FIG. 5, in the embodiment, components in the display device 200b are similar to those in the display device 200a, and one of the differences between the display devices 200a and 200b lies in that a third gap G3 is between the first corner sub-portion 112a and one of the first side portions 114 closest to the first corner sub-portion 112a in the display device 200b. A fourth gap G4 is between the third corner sub-portion 122a and one of the second side portions 124 closest to the third corner sub-portion 122a. A fifth gap G5 is between the second corner sub-portion 112b and one of the first side portions 114 closest to the second corner sub-portion 112b. A sixth gap G6 is between the fourth corner sub-portion 122b and one of the second side portions 124 closest to the fourth corner sub-portion 122b. In the embodiment, the first gap G1, the second gap G2, the third gap G3, the fourth gap G4, the fifth gap G5, and the sixth gap G6 communicate with the gap G, for instance.

The first gap G1, the second gap G2, the third gap G3, the fourth gap G4, the fifth gap G5, and the sixth gap G6 provided herein are air gaps, gas gaps, or vacuum gaps, for instance, which should however not be construed as a limitation to the invention.

In the embodiment, through the first gap G1 between the first corner sub-portion 112a and the second corner sub-portion 112b, the second gap G2 between the third corner sub-portion 122a and the fourth corner sub-portion 122b, the third gap G3 between the first corner sub-portion 112a and one of the first side portions 114 closest to the first corner sub-portion 112a in the display device 200b, the fourth gap G4 between the third corner sub-portion 122a and one of the second side portions 124 closest to the third corner sub-portion 122a, the fifth gap G5 between the second corner sub-portion 112b and one of the first side portions 114 closest to the second corner sub-portion 112b, and the sixth gap G6 between the fourth corner sub-portion 122b and one of the second side portions 124 closest to the fourth corner sub-portion 122b, the display device 200b may further totally reflect the ambient light and directly transmit the ambient light to the display 202. Thereby, in the display device 200*b* provided in the embodiment, the probability of reflecting the ambient light to the viewers by the reflective-refractive surface 110RS (not shown in FIG. 4, see FIG. 2B) of the first prism 110 may be reduced, and the issues of noise and normally white frames are less likely to occur. As a result, the display device 200*b* provided herein can display images with favorable quality.

Figure 6:
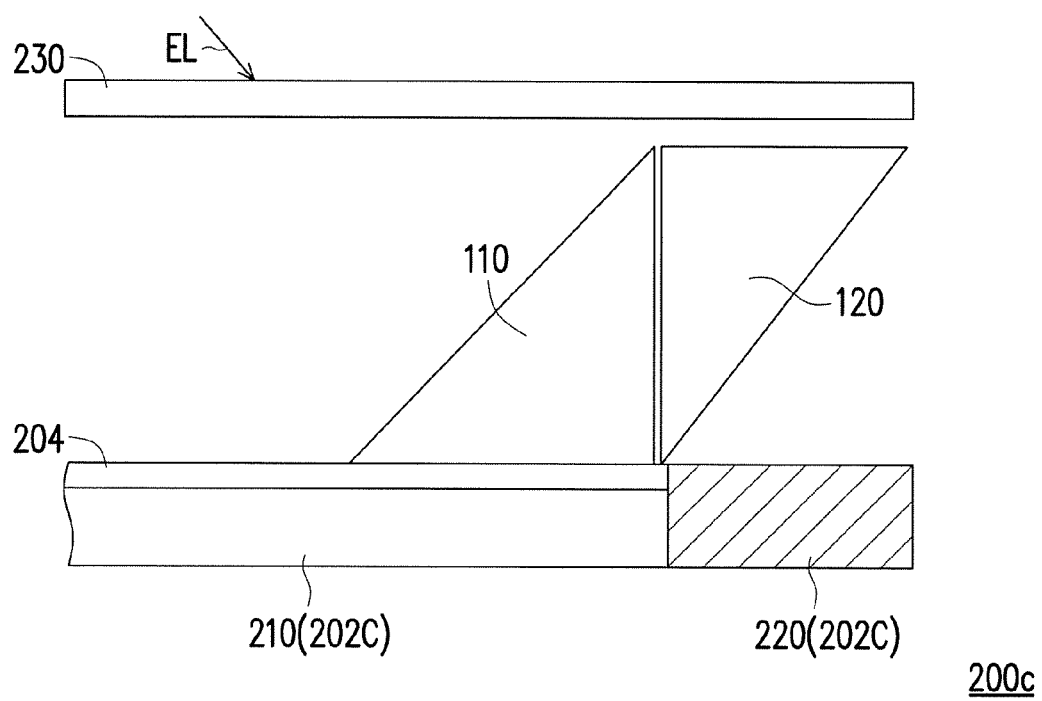
FIG. 6 is a schematic top view illustrating a display device according to another embodiment of the invention.

FIG. 6 is a schematic top view illustrating a display device according to another embodiment of the invention.

With reference to FIG. 6, in the embodiment, components in the display device 200*c* are similar to those in the display device 200, and one of the differences between the display devices 200*c* and 200 lies in that the display device 200*c* further includes a polarizer 230. The polarizer 230 is located above the first prism 110 and the second prism 120. According to the embodiment of the invention, the display device 202*c* further includes another polarizer 204. A transmission axis of the polarizer 230 is substantially parallel to a transmission axis of the polarizer 204. Since the polarizer 230 is able to absorb parts of the ambient light whose polarization direction is different from that of the display image of the display device 200*c*, the reflective ambient light may be reduced in the display device 200*c* provided in the embodiment. For instance, the transmission axis of the polarizer 230 may allow P polarization light of the light beam to pass through, and the transmission axis of the polarizer 204 may also allow the P polarization light of the light beam to pass through. Hence, the S polarization light in the ambient light EL is absorbed by the polarizer 230. In other embodiments of the invention, the transmission axis of the polarizer 230 may allow the S polarization light of the light beam to pass through, and the transmission axis of the polarizer 204 may also allow the S polarization light of the light beam to pass through. Hence, the P polarization light in the ambient light EL is absorbed by the polarizer 230. Through the polarizer 230, the reflected ambient light may be reduced in the display device 200*c*, and the display image may have favorable quality.

In some embodiments of the invention, the display device 200*c* may be selectively equipped with a cover glass (not shown). The cover glass is disposed on the polarizer 230 and serves to protect the polarizer 230 and the display device 200*c*.

In some embodiments of the invention, the reduction of the reflection of the ambient light may not be reduced by the polarizer 230 in the display device. For instance, the display device may include an anti-reflection film (not shown). The anti-reflection film is located on the reflective-refractive surface 110RS of the first prism 110, the first light exiting surface 110OS of the first prism 110, and the second light exiting surface 120OS of the second prism. In some embodiments of the invention, the anti-reflection film is formed through performing a sputtering process, for instance. Thereby, the reflected ambient light may also be reduced in the display device with the anti-reflection film, and the display image can have favorable quality.

Figure 7A:
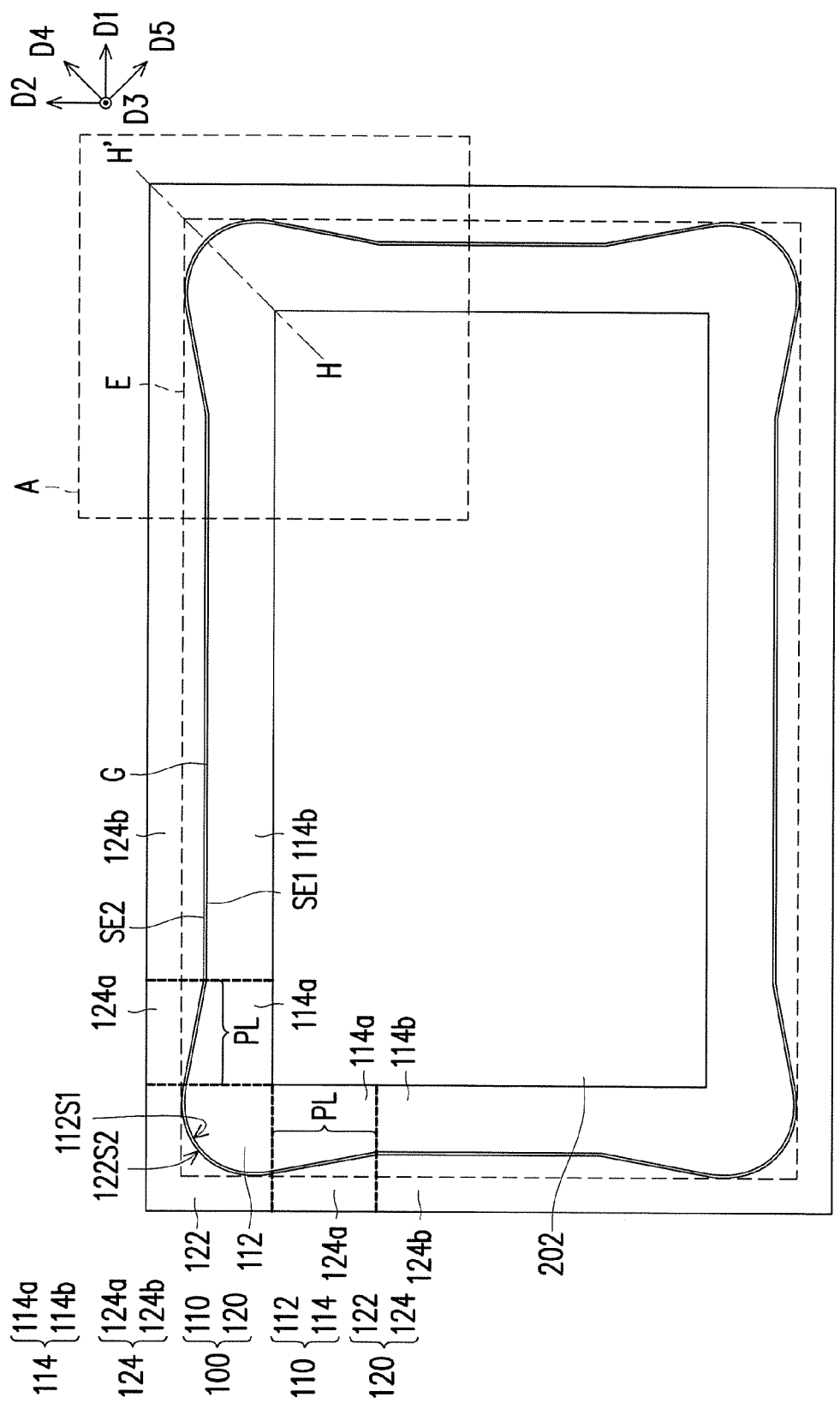
FIG. 7A is a schematic top view illustrating a display device according to another embodiment of the invention.
Figure 7B:
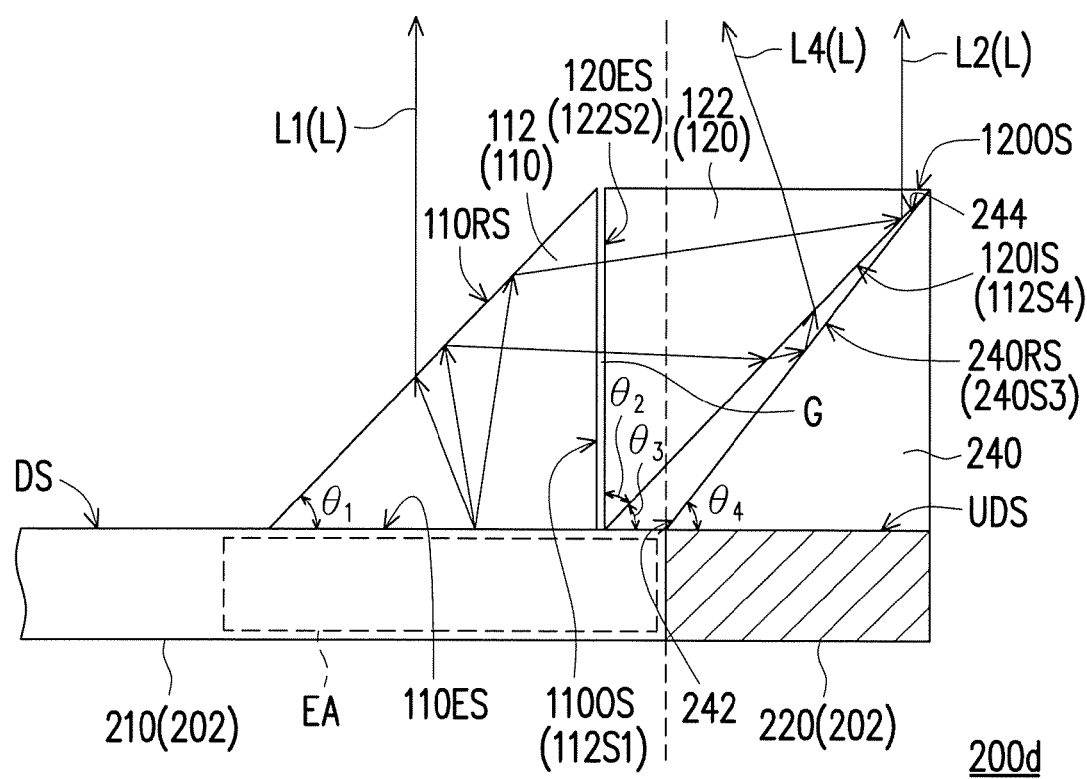
FIG. 7B is a partial cross-sectional side view illustrating a junction (along a line segment H-H') of a display area and a frame area in the display device depicted in FIG. 7A.
Figure 7C:
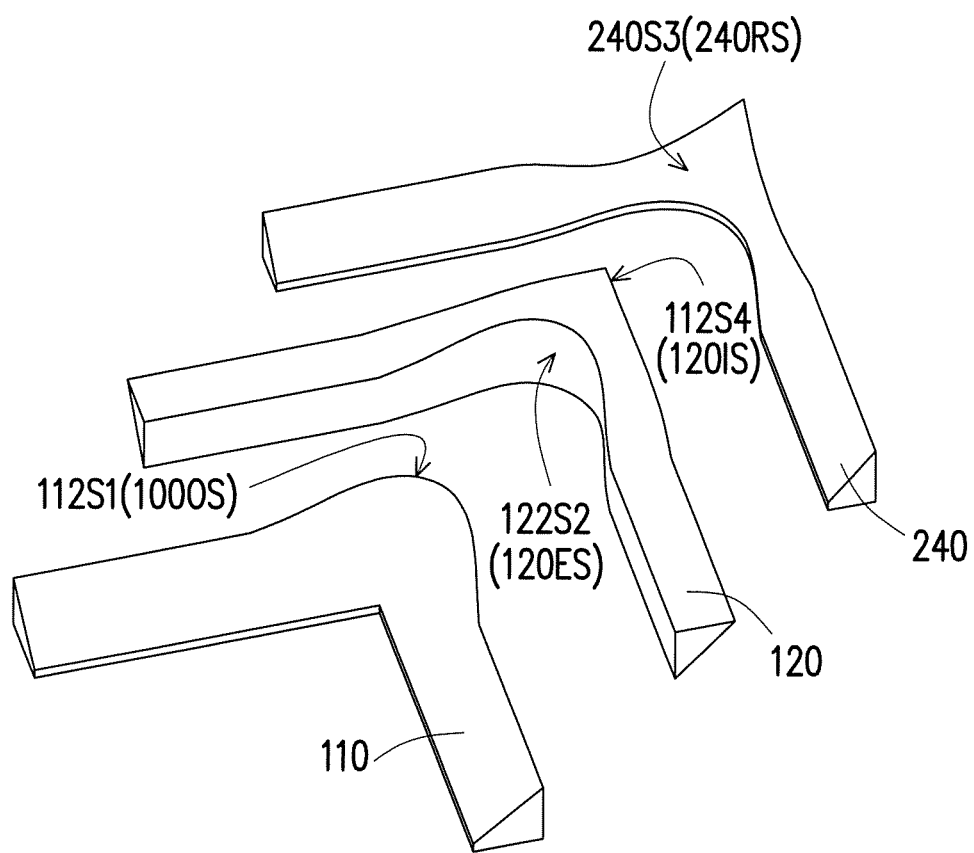
FIG. 7C is a schematic explosive diagram illustrating a portion A depicted in FIG. 7A.

FIG. 7A is a schematic top view illustrating a display device according to another embodiment of the invention. FIG. 7B is a partial cross-sectional side view illustrating a junction (along a line segment H-H') of a display area and a frame area in the display device depicted in FIG. 7A. FIG. 7C is a schematic explosive diagram illustrating a portion A depicted in FIG. 7A. To clearly illustrate the arrangement of the first prism 110, the second prism 120, and a reflective unit 240 of the display device 200*d* provided in the embodiment, FIG. 7C merely shows the reference numbers of the first prism 110, the second prism 120, and the reflective unit 240.

With reference to FIG. 7A and FIG. 7B, in the embodiment, components in the display device 200*d* are similar to those in the display device 200, and one of the differences between the display devices 200*d* and 200 lies in that the display device 200*d* further includes the reflective unit 240 (see FIG. 7B and FIG. 7C). The reflective unit 240 is arranged beside the second prism 120 and has a third free-form curved surface 240S3 corresponding to the second free-form curved surface 122S2 of the second corner portion 122 of the second prism 120. The second corner portion 122 of the second prism 120 has a fourth free-form curved surface 122S4 corresponding to the second free-form curved surface 122S2. Here, the fourth free-form curved surface 122S4 is the inclined surface 120IS. The shape of the second free-form curved surface 122S2, the shape of the third free-form curved surface 122S3, and the shape of the fourth free-form curved surface 122S4 may be the same or different. The reflective unit 240 is a reflector with a reflective surface 240RS, for instance, which should not be construed as a limitation to the invention. The third free-form curved surface 122S3 is the reflective surface 240RS located in the second corner portion 122. It may be observed from FIG. 7B that one end 242 of the reflective surface 240RS substantially adjoins a junction between the display area 210 and the frame area 220. The other end 244 of the reflective surface 240RS adjoins one end of the second light exiting surface 120OS away from the display area 210. Besides, in the embodiment, a third inclined angle $\theta_3$ is between the inclined surface 120IS of the second prism 120 and a surface of the display 202 (i.e., the display surface DS of the display area 210); a fourth inclined angle $\theta_4$ is between the reflective surface 240RS of the reflective unit 240 and a surface of the display 202 (i.e., the non-display surface UDS of the frame area 220). The fourth inclined angle $\theta_4$ is greater than the third inclined angle $\theta_3$. That is, the inclination degree of the reflective surface 240RS relative to the surface of the display 202 is greater than the inclination degree of the inclined surface 120IS relative to the surface of the display 202.

In the embodiment, the second inclined angle $\theta_2$ is between the fourth free-form curved surface 122S4 (the inclined surface 120IS) and the second free-form curved surface 122S2 (the second light incident surface 120ES), and thus the shape of the second free-form curved surface 122S2 is different from the shape of the fourth free-form curved surface 122S4; that is, the shape of the fourth free-form curved surface 122S4 is similar to that of the second free-form curved surface 122S2, but the fourth free-form curved surface 122S4 inclines outward. Besides, in the embodiment, the third inclined angle $\theta_3$ is 45 degrees, for instance, and the fourth inclined angle $\theta_4$ is 51 degrees, for instance. Hence, the shape of the third free-form curved surface 240S3 is different from the shape of the fourth free-form curved surface 122S4; that is, the shape of the third free-form curved surface 240S3 is similar to that of the fourth free-form curved surface 122S4, but the third free-form curved surface 240S3 inclines outward. In addition, as shown in FIG. 7A, the display device 200*d* is rectangular, and thus the shape of the reflective unit 240, the shape of the second side buffer portion 124*a*, and the shape of the inclined surface 120IS of the second corner portion 122 of the second prism 120 are adjusted in response to the rectangular shape of the display device 200*d*, as shown in FIG. 7A and FIG. 7C. Besides, the fourth free-form curved surface provided in the embodiments depicted in FIG. 2A, FIG. 4, FIG. 5, and FIG. 6 is similar or identical to that provided in the embodiment depicted in FIG. 7A, and the shape of the second side buffer portion and the shape of the inclined surface of the second corner portion of the second prism are adjusted in response to the shape of the display device as well; hence, no further description is provided hereinafter.

In the embodiment, the light beam L is emitted from an area of the display area 210 covered by the first light incident surface 110ES. In particular, the light beam L includes light L1 and light L2. The light beam L1 sequentially passes through the first light incident surface 110ES and is refracted by the reflective-refractive surface 110RS to the top of the display area 210. After the light beam L2 passes through the first light incident surface 110ES and enters the first prism 110, the light beam L2 is reflected by the reflective-refractive surface 110RS and is directed to the first light exiting surface 110OS. The light beam L2 sequentially passes through the first light exiting surface 110OS, the gap G, and the second light incident surface 120ES of the second prism 120. The light beam L2 on the inclined surface 120IS is reflected to the second light exiting surface 120OS. In the embodiment, the light beam L further includes light beam L4. After the light beam L4 passes through the first light incident surface 110ES and enters the first prism 110, the light beam L4 is reflected by the reflective-refractive surface 110RS and is directed to the first light exiting surface 110OS. After that, the light beam L4 sequentially passes through the first light exiting surface 110OS, the gap G, and the second light incident surface 120ES of the second prism 120, and the light beam L4 is refracted by the inclined surface 120IS and leaves the second prism 120. The light beam L4 is then reflected by the reflective surface 240RS of the reflective unit 240, re-refracted by the inclined surface 120IS, and enters the second prism 120. The light beam L4 re-entering the second prism 120 is transmitted upward in an inclined manner and is emitted from the second light exiting surface 120OS. In the embodiment, the frame area 220 acting as the non-display area may also display images through the light beam L2 emitted from the second light exiting surface 120OS and transmitted to the top of the frame area 220, such that the display devices 200d may achieve the borderless display effects similar to those accomplished by the display device 200 provided in FIG. 1A to FIG. 1C. Besides, the display device 200d includes a reflective unit 240 that has a reflective surface 240RS. Hence, the light beam L4 that is refracted by the inclined surface 120IS and leaves the second prism 120 may be directed back to the second prism 120 by means of the reflective unit 240 and may be emitted in an inclined manner from the second light exiting surface 120OS. When the viewers view images on the display device 200d from one side of the first prism 110 at a large viewing angle, e.g., in a direction toward the frame area 220 from the reflective-refractive surface 110RS of the first prism 110, the viewers see the images displayed by means of the light beam L4 without observing the borders of the display device 200d; thus, the viewing angle of the display images on the frame area 220 of the display device 200d may be expanded.

In some embodiments of the invention, one end 242 of the reflective surface 240RS is located within the display area 210, and the other end 244 of the reflective surface 240RS adjoins one end of the second light exiting surface 120OS of the second prism 120 away from the display area 210. Alternatively, the end 242 of the reflective surface 240RS is located within the frame area 220, and the other end 244 of the reflective surface 240RS adjoins the end of the second light exiting surface 120OS of the second prism 120 away from the display area 210. The invention should not be limited thereto.

To sum up, the display device and the prism module of embodiments of the invention may achieve at least one of advantages or effects as listed below. The display device of embodiments of the invention is able to accomplish borderless display effects: the prism module of embodiments includes the first prism and the second prism, the first prism is located on the edge area of the display area, and the first corner portions correspond to the corners of the display area; the second prism is located on the frame area of the display and is conformally disposed beside the first prism. Moreover, the first free-form curved surfaces of the first corner portions of the first prism face the second free-form curved surfaces of the second corner portions of the second prism. Since the display device of embodiments includes said prism module and has the arrangement described above, the display device may display images not only in the display area but also in the corner frame area and the edge frame area of the frame area, so as to achieve the borderless display effects. Besides, the reflective unit arranged beside the second prism allows the viewing angle of the display images on the frame area of the display device to be expanded. The reflective unit may be further equipped with the third free-form curved surface corresponding to the second free-form curved surface of the second corner portion of the second prism; as a result, the viewing angle of the display images on the corner frame area can be further expanded.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A display device comprising:
   a display, having a display area and a frame area surrounding the display area, wherein the display area has a plurality of corners; and
   a prism module, comprising:
      a first prism, located on an edge area of the display area, wherein the first prism comprises a plurality of first corner portions, each of the first corner portions is correspondingly arranged in one of the corners of the display area and has a first free-form curved surface; and
      a second prism, located on the frame area and conformally disposed beside the first prism, wherein the second prism comprises a plurality of second corner portions, each of the second corner portions has a second free-form curved surface facing one of the first free-form curved surface.

2. The display device according to claim 1, wherein the first prism further comprises a plurality of first side portions, the first side portions are respectively located adjacent to a plurality of sides of the display area, the second prism further comprises a plurality of second side portions, and the second side portions are respectively located adjacent to the sides of the display area.

3. The display device according to claim 2, wherein each of the first corner portions further comprises a first corner sub-portion and a second corner sub-portion, the first corner sub-portion is located between the second corner sub-portion and one of the first side portions closest to the first corner sub-portion, the second corner sub-portion is located between the first corner sub-portion and one of the first side portions closest to the second corner sub-portion, each of the second corner portions further comprises a third corner sub-portion and a fourth corner sub-portion, the third corner sub-portion is located between the fourth corner sub-portion and one of the second side portions closest to the third corner sub-portion, and the fourth corner sub-portion is located between the third corner sub-portion and one of the second side portions closest to the fourth corner sub-portion.

4. The display device according to claim 3, wherein a first gap is between the first corner sub-portion and the second corner sub-portion, and a second gap is between the third corner sub-portion and the fourth corner sub-portion.

5. The display device according to claim 4, wherein a third gap is between the first corner sub-portion and one of the first side portions closest to the first corner sub-portion, a fourth gap is between the third corner sub-portion and one of the second side portions closest to the third corner sub-portion, a fifth gap is between the second corner sub-portion and one of the first side portions closest to the second corner sub-portion, and a sixth gap is between the fourth corner sub-portion and one of the second side portions closest to the fourth corner sub-portion.

6. The display device according to claim 2, wherein each of the first side portions further comprises a first side buffer portion and a first side main body portion, and the first side buffer portion is located between the first side main body portion and one of the first corner portions,
   wherein the first side main body portion has a first side edge, the first side buffer portion has a first inclined side edge inclining relative to the first side edge,
   each of the second side portions further comprises a second side buffer portion and a second side main body portion,
   the second side main body portion has a second side edge, and the second side buffer portion has a second inclined side edge inclining relative to the second side edge.

7. The display device according to claim 6, wherein in a direction parallel to one of the sides of the display area and away from the first corner portions, the projection length of the first inclined side edge on the one of the sides of the display area is within a range from $0.5 \times W1$ to $W2$, $W1$ is a width of the frame area, and $W2$ is a width half the distance from the first side buffer portion adjacent to the one of the first corner portions to the one of the sides of the display area.

8. The display device according to claim 2, further comprising a polarizer located above the first prism and the second prism.

9. The display device according to claim 2, wherein the first prism has a first light incident surface, a reflective-refractive surface, and a first light exiting surface, wherein the first light incident surface faces the display area, a first inclined angle is between the reflective-refractive surface and the first light incident surface, the first light exiting surface connects the first light incident surface and the reflective-refractive surface, the second prism has a second light incident surface, an inclined surface, and a second light exiting surface, wherein the second light incident surface faces the first light exiting surface of the first prism, the inclined surface connects the second light incident surface and the second light exiting surface, the second light exiting surface is located above the frame area and faces away the frame area, and a second inclined angle is between the inclined surface and the second light incident surface,
   wherein the first inclined angle on a first cross-section passing through one of the corners and one of the first corner portions is a first corner inclined angle, and the second inclined angle on the first cross-section is a second corner inclined angle,
   wherein the first inclined angle on a second cross-section perpendicular to one of the sides of the display area and passing through one of the first side portions and one of the second side portions is a first side inclined angle, and the second inclined angle on the second cross-section is a second side inclined angle,
   wherein the first corner inclined angles on the first cross-sections are substantially equal, the second corner inclined angles on the first cross-sections are substantially equal, the first corner inclined angles are substantially equal to the first side inclined angles, and the second corner inclined angles are substantially equal to the second side inclined angles.

10. The display device according to claim 9, wherein the display area has a display surface, the frame area has a non-display surface, the display surface and the non-display surface are substantially aligned to each other, wherein a height of each of the first corner portions relative to the display surface of the display area is greater than or equal to $\sqrt{2}$ times a height of each of the first side portions relative to the display surface of the display area, and a height of each of the second corner portions relative to the non-display surface of the frame area is greater than or equal to $\sqrt{2}$ times a height of each of the second side portions relative to the non-display surface of the frame area.

11. The display device according to claim 9, wherein a gap is between the first light exiting surface and the second light incident surface, one portion of light beam from an area of the display area covered by the first light incident surface is adapted to sequentially pass through the first light incident surface and is then refracted by the reflective-refractive surface to a top of the display area, another portion of light beam from the area of the display area covered by the first light incident surface is adapted to sequentially pass through the first light incident surface, is reflected by the reflective-refractive surface, passes through the first light exiting surface, the gap, the second light incident surface, and the second light exiting surface to a top of the frame area.

12. The display device according to claim 11, wherein the reflective-refractive surface totally reflects the another portion of light beam from the first light incident surface to the first light exiting surface, and the inclined surface reflects at least parts of the another portion of light beam from the first light incident surface to the second light exiting surface.

13. The display device according to claim 9, further comprising a reflective unit arranged beside the second prism, the reflective unit having a reflective surface, wherein one end of the reflective surface substantially adjoins a junction between the display area and the frame area, and the other end of the reflective surface adjoins one end of the second light exiting surface away from the display area.

14. The display device according to claim 9, wherein the first inclined angle is greater than 10 degrees and less than 80 degrees, and the second inclined angle is greater than 10 degrees and less than 80 degrees.

15. The display device according to claim 9, further comprising an anti-reflection film located on the reflective-refractive surface, the first light exiting surface, and the second light exiting surface.

16. The display device according to claim 1, wherein an orthogonal projection pattern of the first free-form curved surface on a reference plane is a partial circular pattern having a center,
the first corner portion of the first prism is orthogonally projected onto the reference plane to form an orthogonal projection area,
wherein a location of the center on the reference plane is located outside the orthogonal projection area.

17. A prism module suitable for being arranged on an edge area of a display area and a frame area of a display, wherein the display area has a plurality of corners, and the prism module comprises:
a first prism, comprising a plurality of first corner portions and a plurality of first side portions, each of the first corner portions being correspondingly arranged in one of the corners of the display area and having a first free-form curved surface; and
a second prism, conformally disposed beside the first prism, the second prism comprising a plurality of second corner portions and a plurality of second side portions, each of the second corner portions having a second free-form curved surface facing one of the first free-form curved surfaces.

18. The prism module according to claim 17, wherein each of the first side portions further comprises a first side buffer portion and a first side main body portion, and the first side buffer portion is located between the first side main body portion and one of the first corner portions,
wherein the first side main body portion has a first side edge, the first side buffer portion has a first inclined side edge inclining relative to the first side edge,
each of the second side portions further comprises a second side buffer portion and a second side main body portion,
the second side main body portion has a second side edge, and the second side buffer portion has a second inclined side edge inclining relative to the second side edge.

19. The prism module according to claim 17, wherein the first prism has a first light incident surface, a reflective-refractive surface, and a first light exiting surface, a first inclined angle is between the reflective-refractive surface and the first light incident surface, the first light exiting surface connects the first light incident surface and the reflective-refractive surface, the second prism has a second light incident surface, an inclined surface, and a second light exiting surface, wherein the second light incident surface faces the first light exiting surface of the first prism, the inclined surface connects the second light incident surface and the second light exiting surface, and a second inclined angle is between the inclined surface and the second light incident surface,
wherein the first inclined angle on a first cross-section passing through one of the first corner portions and one of the second corner portions is a first corner inclined angle, the second inclined angle on the first cross-section passing through the one of the first corner portions and the one of the second corner portions is a second corner inclined angle,
wherein the first inclined angle on a second cross-section passing through one of the first side portions and one of the second side portions is a first side inclined angle, the second inclined angle on the second cross-section passing through the one of the first side portions and the one of the second side portions is a second side inclined angle,
wherein the first corner inclined angles on the first cross-sections are substantially equal, the second corner inclined angles on the first cross-sections are substantially equal, the first corner inclined angles are substantially equal to the first side inclined angles, and the second corner inclined angles are substantially equal to the second side inclined angles.

20. The prism module according to claim 17, wherein an orthogonal projection pattern of the first free-form curved surface on a reference plane is a partial circular pattern having a center,
the first corner portion of the first prism is orthogonally projected onto the reference plane to form an orthogonal projection area,
wherein a location of the center on the reference plane is outside the orthogonal projection area.

* * * * *